3,039,866
METHOD OF MANUFACTURING CRYSTALLIZED TITANIUM OF HIGH PURITY AND AN APPARATUS FOR CARRYING OUT THE METHOD
Sakae Takeuchi, Sendai City, Japan, assignor to The Research Institute for Iron, Steel and Other Metals of the Tohoku University, Sendai City, Japan
Filed Mar. 6, 1957, Ser. No. 644,250
2 Claims. (Cl. 75—84.5)

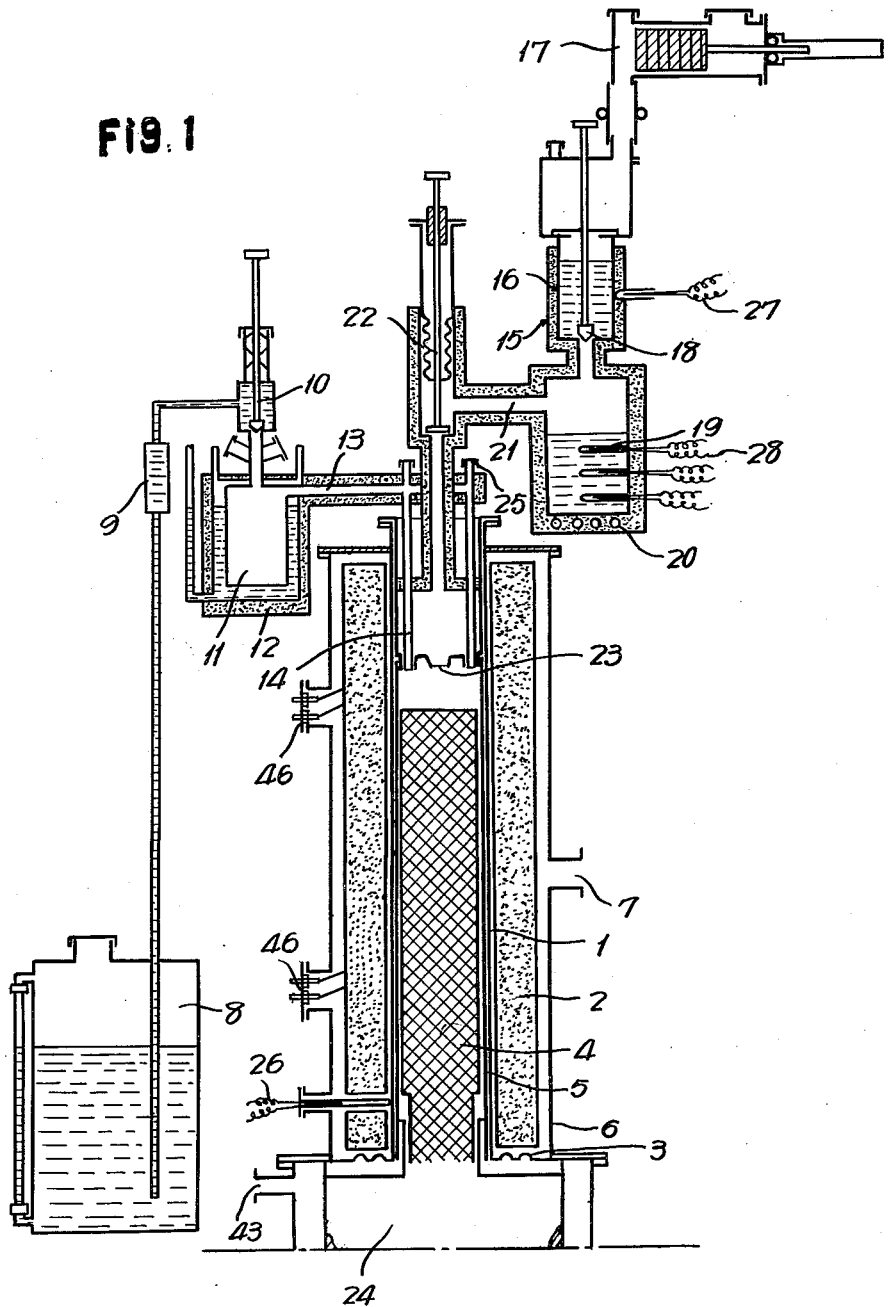

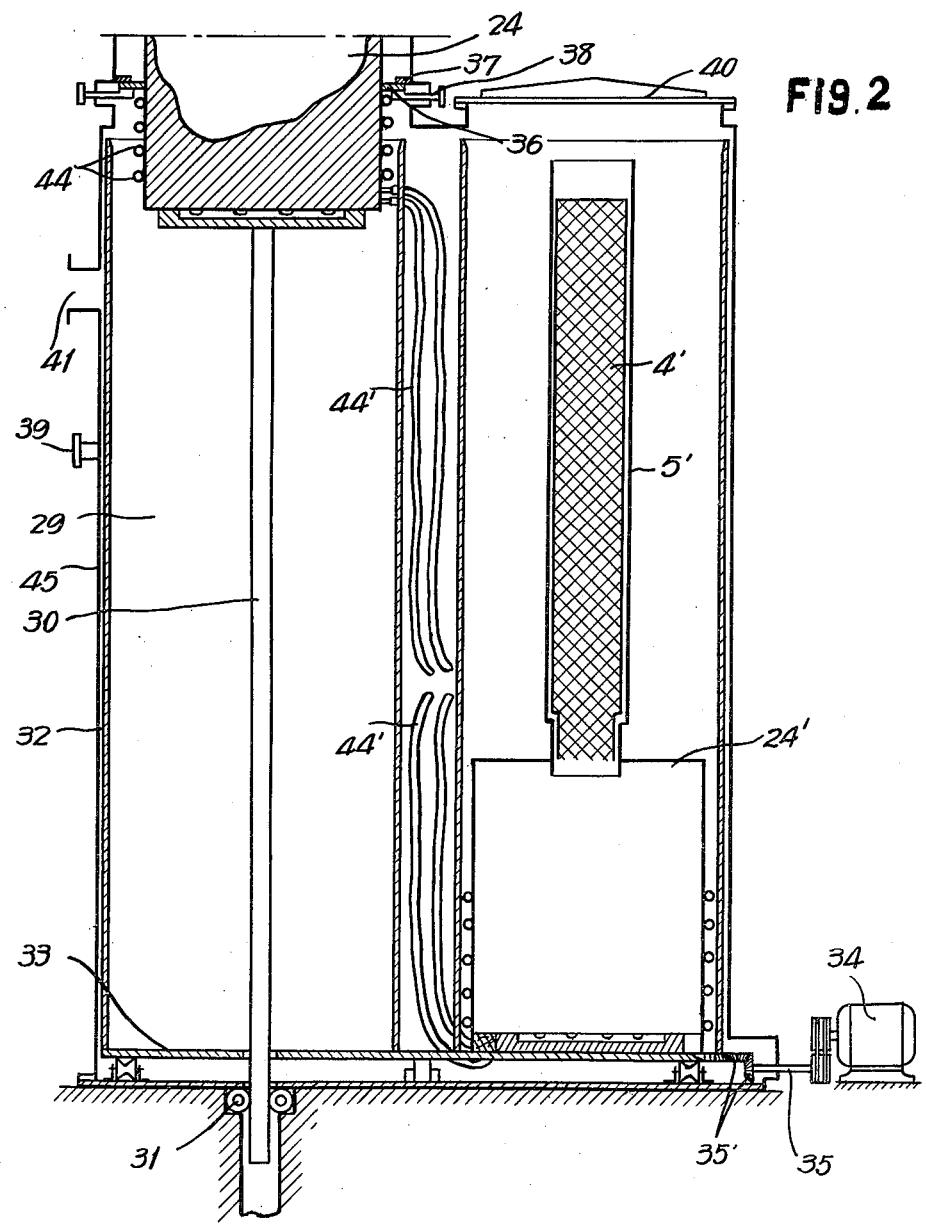

This invention relates to methods and apparatus for continuously producing crystallized metallic titanium of high purity.

An object of this invention is to produce metallic titanium of high purity very easily and at a lower cost than has hitherto been possible.

Another object of this invention is to provide an improved apparatus for carrying out the method of this invention on an industrial scale.

Heretofore known methods of manufacturing metallic titanium on an industrial scale by the reduction of titanium tetrachloride with magnesium consist of reacting molten magnesium at the bottom of a container made of iron or stainless steel, in which air is replaced by argon, with liquid titanium tetrachloride that is poured into the container, thereby producing porous titanium, or so-called spongy titanium. This process is disadvantageous in that a part of the unreacted magnesium and magnesium chloride in the reaction product go into the spongy titanium so that the product is contaminated. A part of this spongy titanium forms a hard layer and firmly adheres to the surface of the reaction vessel and, accordingly, for taking out the metallic titanium in pure condition, the reaction vessel should be cooled after the completion of the reaction and transferred to a dry air-chamber, and the product drilled out of the reaction vessel and then put into a vacuum furnace to be heated for a long time to evaporate and separate magnesium and magnesium chloride mixed in the spongy titanium so that the extra operation requires much labour and electric power consumption, and the cost becomes higher.

According to this invention the operations including reduction, cutting or scraping, vacuum evaporation and so forth can be dispensed with to enable the production of metallic titanium of high purity in compact and crystallized form by a single operation for effecting the reduction and simultaneous evaporation and separation directly. In the former method wherein magnesium and titanium tetra-chloride are reacted in a liquid condition to form porous spongy titanium, various complicated additional operations are necessary.

According to this invention, the above disadvantages are avoided and for this purpose magnesium and titanium tetra-chloride should be reacted in the vapor state. But still it is not sufficient since if vapors of magnesium and titanium tetra-chloride are delivered by the current of argon gas or they are mixed with each other in a vacuum chamber, a greater part becomes powder and is not crystallized. Moreover by-products of the reaction or unreacted magnesium enter into the product so that complicated procedures as described above or a leaching process and so forth is necessary.

A fundamental principle of this invention is based on the fact that titanium tetra-chloride and magnesium as a reducing agent, both in the form of gases, are injected and fed into a reaction tower which is maintained at a high temperature of about 800° C. to about 1100° C. and at a vacuum of about $10^{-4}$ mm. Hg and mixed together therein and impinged on the surface of a small quantity of titanium wire, strip or scrap etc. which is previously arranged in the reaction tower like a wire net so that there occurs wall reaction and metallic titanium is deposited on the wire net in a crystalline form and at the same time the by-product of the reaction, magnesium chloride, is condensed in a lower temperature portion and separated and quickly eliminated to the outside of the reaction system and thus crystalline titanium of high purity can be produced on an industrial scale by a single stage operation.

As described above, according to this invention the reaction chamber must be maintained at a high vacuum above $10^{-4}$ mm. Hg in order to deposit titanium of high purity directly on the metal surface by the wall reaction. Vapors of titanium tetra-chloride and magnesium are evaporated in independent boilers in the same vacuum system as the reaction chamber so that distilled and refined vapor can be delivered to the reaction tower.

Since the reaction is effected on the metal surface, wire nets consisting of a small quanity of metallic titanium wire, strip or cut scrap are arranged in the reaction cylinder to constitute the reaction surface, and gases of the two elements are mixed immediately before reacting the reaction surface so that the gases impinge on the metal to react with each other and deposit the metallic titanium which grows gradually. On the other hand, gaseous magnesium chloride, which is a by-product of reaction and some excess magnesium, are transferred to a separate chamber of a lower temperature, which is independent of the reaction tower heated to a temperature of about 800° C. to about 1100° C. so that they are separated automatically by the difference of vapor pressures and are driven out of the reaction system and do not mingle with the deposited titanium. As long as the crystallized titanium does not completely fill the reaction chamber by its growth, the mixture of gaseous reactants flows into the reaction tower and does not interrupt the reaction by choking the nozzles of magnesium and titanium tetra-chloride.

According to the above principle, when the wire nets are adhered to by the deposited crystalline titanium over their wall surfaces, and the condensing chamber is filled with magnesium chloride and unreacted magnesium they are interchanged with a newly built titanium wire net and another condensing tank by a suitable device and operation without cooling the reaction tower and without contaminating the final product, so that a continuous production can be effected by repeating the above operation.

An apparatus for carrying out the method of this invention is shown in the accompanying drawing, in which FIG. 1 is a diagrammatic vertical sectional view of the upper half part of the device, and FIG. 2 is a similar view of the lower half part of the apparatus.

Referring to the FIG. 1, 1 designates a reaction tower made of special steel, 2 an electric resistance furnace for heating the reaction tower 1 to a temperature of about 800° C. to about 1100° C. In order to compensate for the expansion and contraction of the reaction tower 1 due to its own thermal change a thin steel plate having concentric corrugations 3 is provided at its bottom. The reaction tower is made of a metallic frame structure 4, and if it is made of metal other than Ti, additional pieces of Ti such as wires, strip or cut scraps of Ti are preferably put on the frame 4. A cylinder 5 made of thin titanium plate encloses the frame 4. The heating furnace 2 is covered by an external cylinder 6 which is evacuated through the suction opening 7 which is connected to a vacuum source.

8 represents a tank containing the raw material of titanium tetra-chloride, which is supplied to a boiler 11 through the pipe with a flow meter 9 and a regulating valve 10. 12 represents a heating furnace of the boiler 11, in which the titanium tetra-chloride is vaporized and delivered through the conduit 13 to the branched injection tubes 14 to be injected into the reaction tower.

15 represents a heating furnace for the melting tub 16, and 17 a continuous charging device for magnesium arranged above the melting tub 16, and 18 is an adjusting valve. 19 represents a magnesium boiler and 20 is its heating furnace. The magnesium boiler 19 is connected through the pipe 21 and valve 22 with the magnesium nozzle chamber 23 having a number of injection nozzles.

Below the reaction tower 1 there is provided a waste tank 24 which is supported on a shaft 30 to be operated by the gears 31 (refer to FIG. 2). 32 represents a guide frame, 33 a turntable which is turned by a motor 34 through the shaft 35 and gearing 35′. The waste tank 24 is connected to the titanium cylinder 5 and arranged to be raised and lowered by the shaft 30 and turned on the turntable 33. The tank 24 is provided with water cooling means 44 which is connected with flexible rubber pipe 44′ to a cooling water main.

The lower part of the apparatus for taking out the product and substituting a new titanium cylinder together with a waste tank is totally enclosed by an external covering or cylinder 45 for establishing a vacuum system. 41 represents an opening for vacuum connection.

There is a rubber packing flange 36, fixed on the side surface of the waste tank 24, which is pushed on to another flange 37 by means of shaft 30 and cam 38 which clamps flanges 36 and 37 together. 26, 27 and 28 (FIG. 1) represent thermocouples, and 46 a terminal board.

The manner of operation of the apparatus for carrying out the method of this invention is explained as follows:

The reaction tower 1 is heated to a temperature of about 800° C. to about 1100° C. by the electric resistance heating furnace 2, and the inside of the external cylinder 6 is exhausted to a low pressure. The raw material, titanium tetra-chloride, in the reservoir 8 is delivered through the flow-meter 9 and the regulating valve 10 into the boiler 11 which is included in the same vacuum system as the reaction tower, and the titanium tetra-chloride is vaporized in the boiler heated by the furnace 12 and delivered to injection tubes 14 through the conduit 13 which is covered with heat insulating material in order to avoid recondensation of the vapor. The vapor of titanium tetra-chloride is injected into the reaction chamber.

Magnesium acting as a reducing agent is charged into the melting tub 16 by a continuous charging device 17 and melted in the tub which is heated by the furnace 15. The molten magnesium is supplied through the regulating valve 18 to the boiler 19 and is heated to a temperature of about 650° C. to about 800° C. and vaporized. The magnesium vapor is delivered through the heat insulated passage 21 and the regulating valve 22 into the nozzle chamber and is injected through a number of nozzles 23 into the reaction tower 1. Thus the vapors of titanium tetra-chloride and magnesium injected into the reaction tower 1 are mixed together and impinge on the titanium wire net arranged in the tower and flow down effecting the wall surface reaction. The resulting titanium deposits on the titanium wire net and grows in the crystallized form or mass.

On the other hand, magnesium chloride coming out as a by-product and some excess magnesium proceed downward through the reaction tower 1 and are condensed in the water cooled waste tank or chamber 24 so that they are quickly eliminated out of the reaction system. Accordingly magnesium chloride and unreacted magnesium do not enter into the produced titanium as impurities so that the titanium of high purity is obtained by a single operation.

When the crystallized titanium deposited on the titanium wire nets arranged in the reaction tower has grown substantially compact and to an extent which does not choke the reaction chamber, the waste tank 24 together with the titanium cylinder 5 are transferred to the product interchanging chamber 29 by lowering the shaft 30 downward and is brought on the turntable 33, which latter is turned by revolving the motor 34. A new titanium cylinder 5′ with a new titanium wire net 4′ which is secured to the new waste tub 24′ is substituted with the already reacted titanium cylinder 5 and waste tank 24, and the latter can be taken out by opening the top cover 40 after shutting off the vacuum connection and introducing air through a leak valve 39 into the external casing 45. By repeating the above operation the method of this invention can be carried out continuously. In order to maintain the vacuum in the reaction tower during the above operation, a suitable vacuum tight sealing means (36, 37, 38) should be provided around the waste tank 24 and the surrounding casing 45.

During the removal of the product and interchanging the waste tank 24, the valves 10, 18 and 22 should be closed in order to temporarily stop the supply of vapors of titanium tetra-chloride and magnesium.

At the beginning of the operation, the reaction tower 1 is previously heated to a temperature of about 800° C. to about 1100° C., but the temperature is maintained by the heat generated by the reaction so that the thermal energy can be greatly saved during the operation.

The following examples show the actual results of this invention:

|  | No. 1 | No. 2 |
|---|---|---|
| Quantity of previously prepared titanium net (gr.) | 150 | 120 |
| Quantity of produced titanium (kg.) | 15.7 | 14.55 |
| TiCl₄: |  |  |
| Total quantity of TiCl₄ flown (l) | 42.7 | 40.0 |
| Yield | 85.5 | 83.5 |
| Velocity of flow (cc/min.) | 93.8 | 110.0 |
| Mg: |  |  |
| Total quantity of Mg flown (kg.) | 21.3 | 20.4 |
| Yield (percent) | 75 | 72.7 |
| Velocity of flow (gr/min.) | 46.7 | 56.5 |
| Reaction time (min./sec.) | 7/30 | 6/00 |
| Average hardness (VHN) | 110 | 116 |

What I claim is:

1. A method of producing titanium of high purity in the crystalline state, which comprises vaporizing titanium tetra-chloride and metallic magnesium, injecting the vaporized titanium tetra-chloride and magnesium independently and simultaneously into a reaction tower heated to a temperature of about 800° C. to about 1100° C. and maintained at a negative pressure of about $10^{-4}$ mm. Hg, arranging a quantity of preformed titanium in the reaction tower, impinging the vapor on the titanium and thereby effecting a mixing and reaction of said two vapors and a depositing of crystalline titanium by reduction on the surface of the preformed titanium, and gravitationally separating by-products out of the reaction system, removing and delivering said by-products to a lower temperature chamber which is separate from the reaction tower to condense therein so that the by-products are prevented from incorporating into the deposited titanium.

2. An apparatus for producing titanium of high purity in crystallized state comprising a vacuum-tight reaction tower, means heating the tower to a temperature of about 800° C. to about 1100° C., a reaction cylinder consisting of titanium pieces in said reaction tower, a waste chamber arranged below the reaction tower to receive by-products and unreacted raw material, cooling means operatively associated with said waste chamber to condense the by-products and unreacted raw material, a heating and vaporizing device for titanium tetra-chloride, a heating and vaporizing device for magnesium, a plurality of nozzles connected to the vaporizing device for the titanium tetra-chloride and opening into the reaction cylinder, a nozzle for injecting magnesium vapor from said magnesium vaporizing device into said reaction chamber, a product interchanging device including an external envelope for vacuum-tightly enclosing the lower part of the reaction tower, a turn table rotatably supported in said envelope, a plurality of water cooled waste tanks on said turn table, a supporting shaft for vertically displacing said tanks, a reaction cylinder detachably secured to said waste tanks, means for vertically moving said supporting shaft, a device for rotating said turntable and thereby interchanging a fresh reaction cylinder with the first said reaction cylinder, means defining a covered opening for said envelope for taking out the reaction cylinder after the completion of a reaction, and means for maintaining the whole system under vacuum.

References Cited in the file of this patent

UNITED STATES PATENTS

| | | |
|---|---|---|
| 204,307 | Duff | May 28, 1878 |
| 1,306,568 | Weintraub | June 10, 1919 |
| 2,140,607 | Thompson | Dec. 20, 1938 |
| 2,739,566 | Shapiro et al. | Mar. 27, 1956 |
| 2,778,726 | Winter et al. | Jan. 22, 1957 |
| 2,796,644 | Kuhn | June 25, 1957 |
| 2,816,828 | Benedict et al. | Dec. 17, 1957 |

FOREIGN PATENTS

| | | |
|---|---|---|
| 1,088,006 | France | Sept. 1, 1954 |
| 734,166 | Great Britain | July 27, 1955 |